United States Patent [19]

Anderson et al.

[11] Patent Number: 4,759,041
[45] Date of Patent: Jul. 19, 1988

[54] LOCAL AREA NETWORK CONTROL SYSTEM SYNCHRONIZATION WITH PHASE-LOCK LOOP

[75] Inventors: Steven C. Anderson, Prior Lake; Joseph Pobiel, Eagan, both of Minn.

[73] Assignee: Unisys Corporation, Blue Bell, Pa.

[21] Appl. No.: 16,433

[22] Filed: Feb. 19, 1987

[51] Int. Cl.$^4$ .............................................. H04L 7/00
[52] U.S. Cl. .................................. 375/118; 370/102; 370/108
[58] Field of Search ................... 375/82, 97, 119, 120, 375/118; 370/84, 102, 108; 331/1 A, 25; 328/63, 134, 155; 455/76, 182, 183

[56] References Cited

U.S. PATENT DOCUMENTS

| | | | |
|---|---|---|---|
| 3,988,696 | 10/1976 | Sharpe | 331/1 A |
| 4,181,975 | 1/1980 | Jenkins | 375/118 |
| 4,270,183 | 5/1981 | Robinson et al. | 375/118 |
| 4,280,099 | 7/1981 | Ratt Lingourd | 375/119 |
| 4,280,104 | 7/1981 | Rzeszewski | 331/25 |
| 4,330,856 | 5/1982 | Takasaki et al. | 370/102 |
| 4,363,002 | 12/1982 | Fuller | 375/120 |
| 4,400,817 | 8/1983 | Sumner | 375/119 |
| 4,451,930 | 5/1984 | Chapman et al. | 375/97 |
| 4,654,859 | 3/1987 | Kung et al. | 331/1 A |
| 4,679,003 | 7/1987 | Sagawa et al. | 375/120 |

Primary Examiner—Robert L. Griffin
Assistant Examiner—Stephen Chin
Attorney, Agent, or Firm—Glenn W. Bowen; Laurence J. Marhoefer

[57] ABSTRACT

A local area network packet receiving system synchronizes the passage of packets through a receive buffer through a synchronizing circuit which supplies clock pulses to the receive buffer. The clock system utilizes a sensing circuit that senses the rate at which packets are being stored in the receive buffer. A master oscillator provides a reference signal and a rate control circuit coupled to the sensing circuit controls the rate at which the clock pulses are supplied to the receive buffer. A programmable timer supplies timing pulses out of the control of the rate control circuit. A phase-lock-loop having first and second comparison inputs is coupled to the programmable timer to receive the timing pulses on the first comparison input and to the master oscillator to receive a reference signal on the second comparsion input. A pulse circuit is coupled to the phase-lock-loop to supply clock pulses which are derived from the output of the phase-lock-loop, and which have a pulse repetition rate that matches the rate at which packets are being stored in the receive buffer.

4 Claims, 2 Drawing Sheets

LOCAL AREA NETWORK CONTROL SYSTEM SYNCHRONIZATION WITH PHASE-LOCK LOOP

BACKGROUND OF THE INVENTION

Conventional telephone communication systems over local area networks, such as the standard Ethernet network or other network systems, conventionally employ a transmitting analog-to-digital converter at the transmitting end and a receiving digital-to-analog converter at the receiving end in an attempt to operate at the same sampling rate. An example of such a system is shown in FIG. 1 of the drawings which is labeled prior art.

The prior art transmitting and receiving system 10 consists of a transmitter 12 and a receiver 13. In the system of FIG. 1, analog signals from the telephone at the transmitting end are supplied on the line 14 to an analog-to-digital converter 16, which samples the analog signals at sampling times that are determined by the transmit clock 18, which is connected to the analog-to-digital converter 16 over the line 1.

The output of the sampled A/D converter is supplied on the line 20 to a transmit buffer storage device 24. The transmit buffer 24 may be a shift register which is controlled by the transmit clock 18 over the cable 26. As the sample data is received, it is grouped into "packets", such as the packets 28 and 30 which are stored in the transmit buffer 24. The first packet received from the A/D converter 16 on the line 20 is shifted through the buffer so that it is the first packet which is transmitted out of the buffer on line 32 and over the LAN 34. Thus, the packet 28 in the buffer 24 represents a sample of data which has been sampled at time prior to the packet 30.

After transmission over the LAN, the signals are received on the line 36 and are reassembled into packets and stored in the receive buffer 38. The receive buffer, like the transmit buffer, is a first-in/first-out (FIFO) type of device, such as a shift register, so that the packet 40 is a sample packet which preceded the packet 42 in time at the transmitting sampling point of the A/D converter 16. The packet 40 will then be sent out of the receive buffer 38 over the line 44 prior to the transmission of the packet 42 under the control of the receive clock 46, which applies clock signals on the lines 48 and 50. The digital-to-analog converter 52 supplies its analog output signal to the telephone at the receiving end over the line 54.

In a conventional LAN all network Hosts are attached to the same transmission medium which may be a baseband coaxial cable. The packets that are transmitted consist of data and control information such as source and destination addresses. The packets are then given to the network and routed from the source computer to the destination computer on a packet by packet basis and, therefore, network resources are only allocated when data is actually being transmitted which improves the overall efficiency of the network. When no transmissions are taking place on the cable, any Host may begin transmitting its own packet to another destination Host. When the destination Host recognizes the packet containing its address as its destination, it processes the packet and passes the information to its own computer. All other Hosts on the network disregard the packet since it did not contain their address as the destination. When collisions occur between the data, retransmission attempts are made according to the "truncated binary exponential" back-off method specified by the Ethernet protocol.

In practice the type of system described in FIG. 1 is designed so that the transmit clock 18 and the receive clock 46 will operate at the same sampling rate. However, in operation there will always be small differences between the transmit and receiving clock frequencies. When this occurs the number of packets in the receive buffer will grow or diminish an average rate which is a function of the difference between the rate that the packets are received in the transmit buffer 24 and the receive buffer 38. If the analog-to-digital conversion is digitizing at a slower rate than the digital-to-analog conversion, it is possible that the receiver buffer can become empty which will result in periods of unwanted silence. On the other hand if the analog-to-digital conversion is digitizing at a faster rate than the digital-to-analog conversion then the buffer can completely fill up or saturate and thus cause speech packets to be missed by the transmitter.

The present invention, is directed to solving the problem mentioned in the Background of the Invention wherein the receive and transmit buffers may operate at different rates. This can result in either the receive buffer completely filling up, or in its missing a speech packet or becoming empty, resulting in periods of unwanted silence. This problem is solved by the present invention by controlling the receive buffer clock so that it operates at either a slower rate than the transmission buffer clock when the transmitted data rate is low, or at a faster rate than the transmission buffer clock when the transmitted data rate is high.

BRIEF DESCRIPTION OF THE DRAWINGS

The present invention is described by reference to the drawings in which.

TECHNICAL DESCRIPTION OF THE INVENTION

Figure 1:
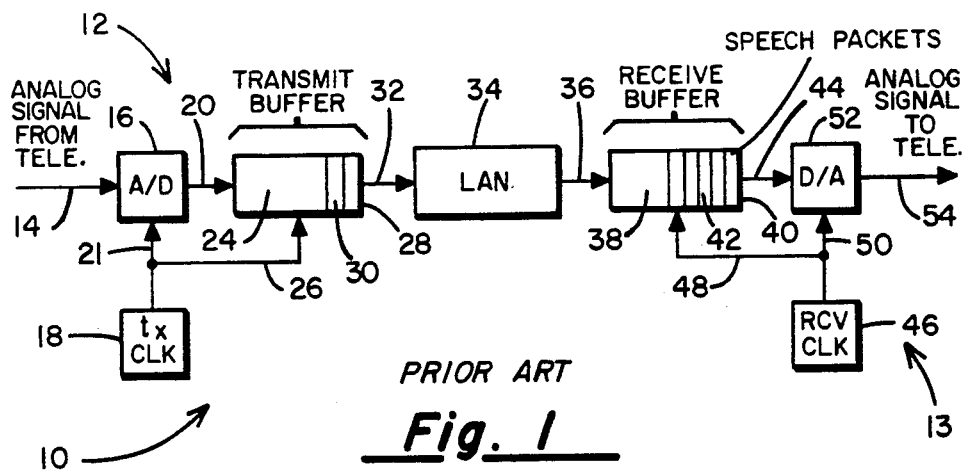
FIG. 1 is prior art local area network configuration which is described in the Background of the Invention.
Figure 2:
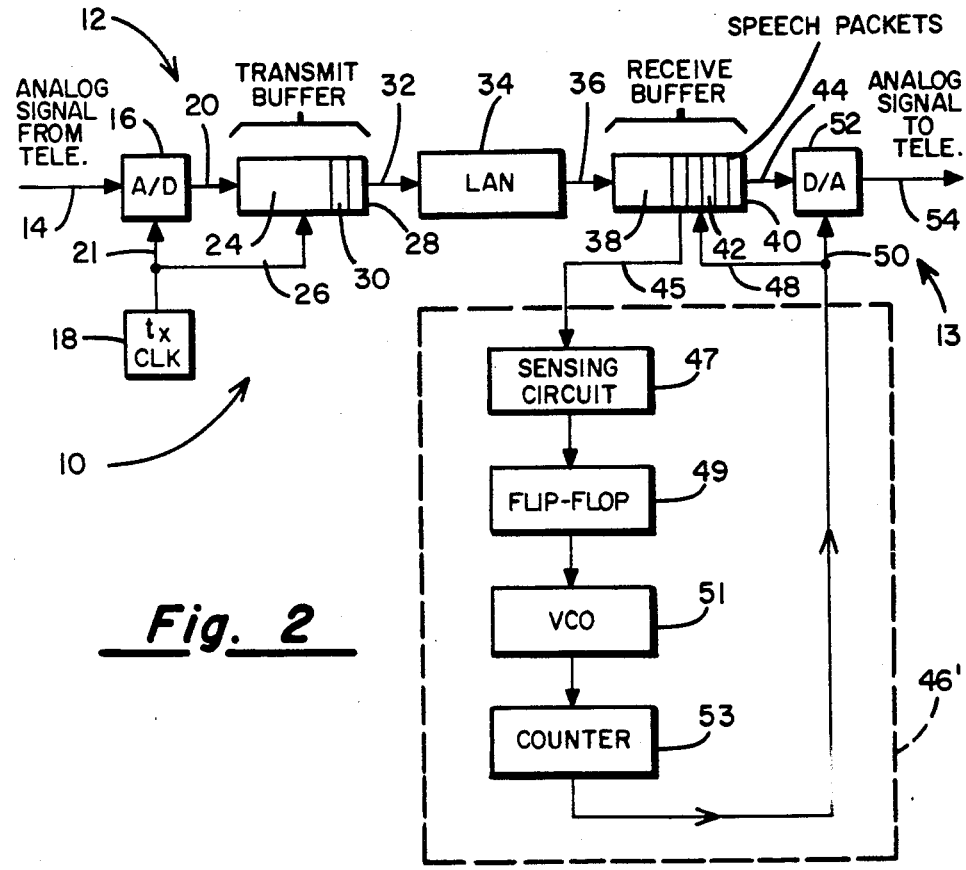
FIG. 2 is a block diagram of one improved local area network configuration.
Figure 3:
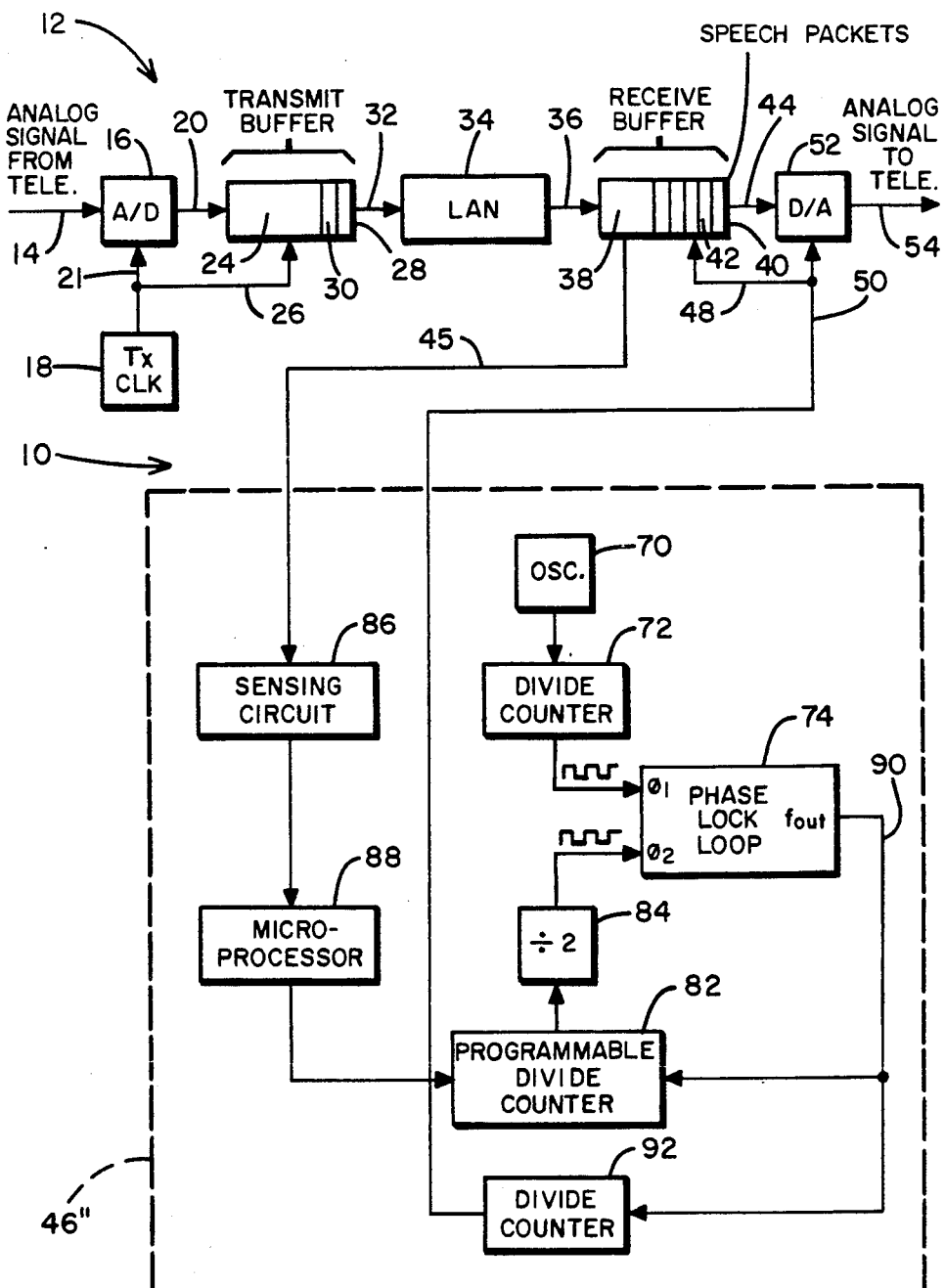
FIG. 3 is a block diagram of another improved local area network configuration.

The description of the prior art local area network in the Background of the Invention applies also to the systems shown in FIGS. 2 and 3, with the exception that the receive clocks 46' and 46" have additional control functions added to them, so that they may operate at a fast clock rate or a slow clock rate. The slow clock repetition rate is slower than the worst case minimum pulse repetition rate of the transmission clock 18 and the fast clock rate is faster than the worst case maximum pulse repetition rate of the transmission clock 18.

In the system of FIG. 2, (which is the subject of copending application Ser. No. (016,701) filed on the same date as this application in the names of Steven T. Barham and John W. Love and assigned to the assignee of the present invention), upon initialization the receive clock 46' is preferably set to the slower of its two clock frequencies. The number of packets in the receive buffer 38, therefore, grows at the rate of the difference between the transmission clock rate and the slow frequency pulse repetition rate of the receive clock 46'. When the receive buffer receives a predetermined number of packets it fills up to a certain queue size. A sensing circuit 47 which is coupled to the receive buffer 38 via line 45 controls a flip-flop 49. When the receive buffer 38 is filled, to a certain level the flip-flop 49 changes from one of its output logic states to the other.

The flip-flop 49 is coupled to a voltage control oscillator (VCO) 51 which produces a first clock output frequency when one logic state is applied to it by the flip-flop 49, and a second higher frequency state when the other output logic state is applied to it. Upon the change of the logic state of the flip-flop 49, when the receive buffer 38 is filled, the VCO 51 will switch to operate at the higher clock frequency. The output of the VCO 51 is coupled to the counter 53 which counts the oscillations of the VCO and produces an output pulse upon a predetermined number of counts of the VCO. The output pulse of the counter on the line 50 is utilized as the receive clock signal and is coupled to the digital-to-analog converter 52. Although a single switching point, and only two clock frequencies are described for the embodiment of FIG. 2, it is apparent that multiple threshold levels, and additional clock frequencies may be utilized within the scope of the present invention.

The improved system of FIG. 3 of the present invention relies on a closed phase-locked loop path for control, and as such it is able to provide synchronization for a much larger range of frequencies of the transmit clock 18 and it dynamically converges as well within a small error band to the transmit clock 18. The tracking error produced by this method yields superior performance over that of FIG. 2 by limiting the error to a function of the minimum granularity, or fine increment tracking capability of the PLL as apposed to a function of the worst case differential in transmit clock frequencies within the entire LAN system.

It should be pointed out that the improved system of FIG. 3 allows for wide variance in the frequency of the transmit clock 18 while still providing a small tracking error. The system of FIG. 2 provides frequency tracking of the transmit clock which over the long term averages out to the same as that of the transmit clock. However, at any given instant the frequency error in the system of FIG. 2 may be as much as the difference between the upper and lower frequency points of the VCO.

The receive clock 46" of FIG. 3 includes a master oscillator which is coupled to a divide counter 72 which converts the signal to a digital pulse repetition rate with a duty cycle of 50% and substantially lower frequency (about 10 Hz). The output of the divide counter 72 is coupled to the phase one (P1) comparison input of the phase-lock-loop.

The output of the phase-lock-loop 74 is sent on the line 90 to a programmable counter 82 which has a number of stages (for example, eighteen). The circuit 82 divides the frequency of the signal on line 90 by a factor determined by the microprocessor 88. The output of the counter 82 is again divided by two by the divide-by two circuit 84. The output of the divide-by-two 84 is a signal with a 50% duty cycle which is supplied to the phase two (P2) comparison input to the phase-lock-loop 74. The setting of the counter 82 is controlled by the microprocessor 88 which is coupled to the sensing circuit 86 that determines the rate at which the receive buffer is receiving information by sampling the line 45. (For example, if center frequency of the phase-lock-loop is 2.048 Mhz, the output, Fout, of the phase-lock-loop will be a signal with a frequency of 2.048 Mhz±2048 hz.)

The signal on the line 90 to the divide counter 92 is thus determined by the frequency of the phase-lock-loop 74 which is effected by the multiplication factor that is applied to the divide counter 82. Thus the output of the divide counter 92 is a signal which is controllable in very small increments, and may be utilized on the line 48 as the receive clock to obtain very close control over the synchronization of the rate that data is stored in the receive buffer 38. In operation, when the number of packets being inserted into the buffer increases beyond a given rate, then the clock frequency control count will be incremented under control of the microprocessor 88 and the counter 82 to produce a higher frequency. On the other hand if packets entering the receive buffer fall below a specified minimum rate, then the frequency control count will be decremented, under the control of the microprocessor 88 and the counter 82 to produce a lower frequency with the same degree of control. Each incrementation or decrementation of the frequency may produce an increase in the magnitude of the frequency by about 20 parts per million.

What is claimed is:

1. In a local area network packet receiving system comprising receive buffer means, and clock means for synchronizing the passage of packets through said receive buffer means, the improvement comprising output means for supplying clock pulses to said receive buffer means and clock means which comprises sensing means for sensing the rate at which said packets are being stored in said receive buffer means, master oscillator means for providing a reference signal, rate control means coupled to said sensing means for controlling the rate at which said output means supplies said clock pulses, and programmable timing means which supplies timing pulses under the control of said rate control means, wherein said output means comprises phase-lock loop means having first and second comparison inputs coupled to said programmable timing means to receive said timing pulses on said first comparison input and to said master oscillator means to receive said reference signal on said second comparison input and pulse means for supplying clock pulses derived from the output of said phase-lock loop means which have pulse repetition rates that match the rate at which packets are being stored in said receive buffer means.

2. In a local area network receiving system as claimed in claim 1 the improvement comprising digital-to-analog converter means coupled to said receive buffer means to receive said packets and to said output means to receive said clock pulses.

3. A system to control the clocking of a receive buffer in a local area network in which a first digital signal is applied on one input of a phase-locked loop means and a second digital signal is supplied on a second input of said phase-locked loop means, and an output of said phase-locked loop means supplies a signal representative of the phase difference between said first and second signals, wherein the system comprises
   first signal means for supplying said first digital signal at a predetermined frequency coupled to said first input,
   programmable frequency divider means coupled to said output to receive said output signals and to said second input of said phase-locked loop means in order to provide a programmed frequency divided signal as said second digital signal thereto,
   coupling means coupled to said output to supply a clock output signal to said receive buffer, and control means for controlling the frequency of said programmable frequency divider means coupled to said programmable frequency divider means, wherein said control means comprises a sensing circuit which is coupled to said receive buffer to sense the rate at which data packets are stored in the receive buffer so that the clock output signal from said coupling means controls the clocking of information through the receive buffer in response to said sensing means.

4. The use of a system to control the clocking of a receive buffer in a local area network in which a first digital signal is applied on one input of a phase-locked loop means and a second digital signal is supplied on a second input of said phase-locked loop means, and an output of said phase-locked loop means supplies a signal representative of the phase difference between said first and second signals, wherein the system comprises first signal means for supplying said first digital signal at a predetermined frequency coupled to said first input, programmable frequency divider means coupled to said output to receive said output signals and to said second input of said phase-locked loop means in order to provide a programmed frequency divided signal as said second digital signal thereto, coupling means coupled to said output to supply a clock output signal to said receive buffer, and control means for controlling the frequency of said programmable frequency divider means coupled to said programmable frequency divider means, wherein said control means comprises a sensing circuit which is coupled to said receive buffer to sense the rate at which data packets are stored in the receive buffer so that the clock output signal from said coupling means controls the clocking of information through the receive buffer in response to said sensing means.

* * * * *